(12) United States Patent
Crews

(10) Patent No.: US 12,291,186 B2
(45) Date of Patent: May 6, 2025

(54) LIFT MECHANISM HYDRAULIC FLUID PROPULSION WITH MAGNETIC LIFT ASSISTANCE

(71) Applicant: Eric Jason Crews, Blacksburg, VA (US)

(72) Inventor: Eric Jason Crews, Blacksburg, VA (US)

( * ) Notice: Subject to any disclaimer, the term of this patent is extended or adjusted under 35 U.S.C. 154(b) by 15 days.

(21) Appl. No.: 18/405,404

(22) Filed: Jan. 5, 2024

(65) Prior Publication Data
US 2024/0182015 A1    Jun. 6, 2024

Related U.S. Application Data

(63) Continuation-in-part of application No. 18/045,294, filed on Oct. 10, 2022.

(60) Provisional application No. 63/479,010, filed on Jan. 9, 2023, provisional application No. 63/253,967, filed on Oct. 8, 2021.

(51) Int. Cl.
*B60V 1/14*    (2006.01)
*F03H 99/00*    (2009.01)

(52) U.S. Cl.
CPC .............. *B60V 1/14* (2013.01); *F03H 99/00* (2013.01)

(58) Field of Classification Search
CPC ....................................................... B60V 3/08
See application file for complete search history.

(56) References Cited

U.S. PATENT DOCUMENTS

| | | | |
|---|---|---|---|
| 3,158,765 | A | 11/1964 | Polgreen |
| 3,231,224 | A | 1/1966 | Koelle |
| 4,795,113 | A | 1/1989 | Minovitch |
| 5,485,721 | A | 1/1996 | Steenborg |
| 8,281,566 | B2 | 10/2012 | Grayson et al. |
| 9,079,671 | B2 | 7/2015 | Endres |
| 10,065,751 | B2 | 9/2018 | Kawahara et al. |
| 10,287,033 | B2 | 5/2019 | Hu |
| 11,028,773 | B2 | 6/2021 | Karam et al. |
| 11,156,187 | B2 | 10/2021 | Zauderer |
| 11,203,447 | B1 | 12/2021 | Holmes |
| 11,568,739 | B2 | 1/2023 | McNicholas |

(Continued)

FOREIGN PATENT DOCUMENTS

| JP | 2016155518 A | * | 9/2016 | ............... B60V 1/08 |
|---|---|---|---|---|
| WO | WO-2021079377 A1 | * | 4/2021 | ............. B64U 30/27 |

*Primary Examiner* — Christopher P Ellis
(74) *Attorney, Agent, or Firm* — Dunlap Bennett & Ludwig, PLLC

(57) ABSTRACT

A fuel less pneumatic and hydraulic lift system flight system provides the following systemic components. A chassis supporting an electric battery and a pressurized base hydraulic cylinder, a hydraulic fluid pumping assembly fluidly coupled to the pressurized base hydraulic cylinder; a lift mechanism assembly providing an attractive levitation plate mounted to the chassis; and a repulsive levitation plate mounted to a carriage, wherein the repulsive levitation plate is disposed in a magnetic pole repulsive alignment relative to the attractive levitation plate causing a magnetic lift effect to the chassis; and a plurality of propulsions jets mounted to the chassis, wherein the plurality of propulsion jets enabling motive functionality using hydraulic fluid propulsion and pneumatic pressure via the hydraulic fluid pumping assembly in conjunction with the magnetic lift effect.

10 Claims, 3 Drawing Sheets

(56) References Cited

U.S. PATENT DOCUMENTS

| | | |
|---|---|---|
| 2005/0178920 A1 | 8/2005 | Wilson |
| 2013/0106106 A1* | 5/2013 | Andujar .................. F15B 1/265 290/43 |
| 2020/0024006 A1 | 1/2020 | Kingo |
| 2022/0227502 A1 | 7/2022 | Freedman |
| 2023/0127987 A1 | 4/2023 | Crews |

* cited by examiner

LIFT MECHANISM HYDRAULIC FLUID PROPULSION WITH MAGNETIC LIFT ASSISTANCE

CROSS-REFERENCE TO RELATED APPLICATION

This application claims the benefit of priority of U.S. provisional application No. 63/479,010, filed 9 Jan. 2023, and claims the benefit of priority of U.S. non-provisional application Ser. No. 18/045,294, filed 10 Oct. 2022, as a Continuation-in-Part thereof, the contents of both are herein incorporated by reference.

BACKGROUND OF THE INVENTION

The present invention relates to hovercrafts and, more particularly, a lift mechanism hydraulic fluid propulsion with magnetic lift assistance.

Floating vehicles and hovercrafts have captured the imagination of engineers for decades. However, current hovercrafts can lose vehicle control when running over road deprivations. Furthermore, current systems take fuel and do not implement sealed propulsion for enabling vertical lift with zero external displacement. Furthermore, hovercrafts that displace air flow as a main force to hover are a poor design for wildfire suppression due to the open propeller type aircraft fanning the flames.

As can be seen, there is a need for a hovercraft embodying a lift mechanism and motive functionality using hydraulic fluid propulsion and pneumatic pressure with magnetic lift assistance to obtain sustained transportation. The vertical "propellant" is pressurized oil under pressure injecting into air pressure. The "sealed propulsion for enabling vertical lift" in the design uses "state of phase" of material to obtain sealed lift/propulsion—i.e., air pressure flexes and hydraulic fluid acts as a solid, The lift jet's fluid speed acts like a liquid flywheel storing inertia that is harvested as electricity using the cyclical nature of "retained" work as retained air pressure, that also increases the oil pressure level, making the discharge rate of oil sufficient to cause lift on the unit as a sealed object. The oil jet then advances in rotational speed by electricity.

SUMMARY OF THE INVENTION

In one aspect of the present invention, fuel less pneumatic and hydraulic lift system flight system, the flight system includes the following: a chassis supporting an electric battery and a pressurized base hydraulic cylinder; a hydraulic fluid pumping assembly fluidly coupled to the pressurized base hydraulic cylinder; a lift mechanism assembly providing the following: an attractive levitation plate mounted to the chassis; and a repulsive levitation plate mounted to a carriage, wherein the repulsive levitation plate is disposed in a magnetic pole repulsive alignment relative to the attractive levitation plate causing a magnetic lift effect to the chassis; and a plurality of propulsions jets mounted to the chassis, wherein the plurality of propulsion jets enabling motive functionality using hydraulic fluid propulsion and pneumatic pressure via the hydraulic fluid pumping assembly in conjunction with the magnetic lift effect.

In another aspect of the present invention, the flight system further includes wherein the hydraulic fluid pumping system further has the following: an electric motor electrically connected to the battery; a fluid reservoir; an oil hydraulic piston pump; and a fluidly coupled hydraulic fluid suction assembly for selectively adjusting a compression level of one or more of said levitation plates; further providing an electric air flight rudder for controlling the plurality of propulsions jets, wherein each air jet is configured to have a flow cycle producing hydraulic draft while producing electrical current; further providing a thrust displacement chamber disposed between the pressurized base hydraulic cylinder and the plurality of propulsion jets, wherein a first air pressurization in the thrust displacement chamber urges a pressurization cycle producing force vectoring thrust in each of the plurality of propulsion jets; further providing two or more turn vents for selectively redirecting an air flow from the plurality of propulsion jets via actuated louvers; further providing one or more flight control levers configured to electrically adjust a magnetic field strength corresponding to a vertical direction relative to attractive and repulsive levitation plates, wherein a hydraulic fluid pressure via the hydraulic fluid pumping assembly is configured to change a distance between the attractive and repulsive levitation plates; further providing one or more flight control levers, controlling the one or more turn vents and the magnetic field strength via a hydraulic fluid piston, and wherein each propulsion jet comprises an oil-air pressure fluid transfer component enabling oil-air pressure control, which in turn feeds electricity to a hyper jet oil pump electric motor.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Figure 1:
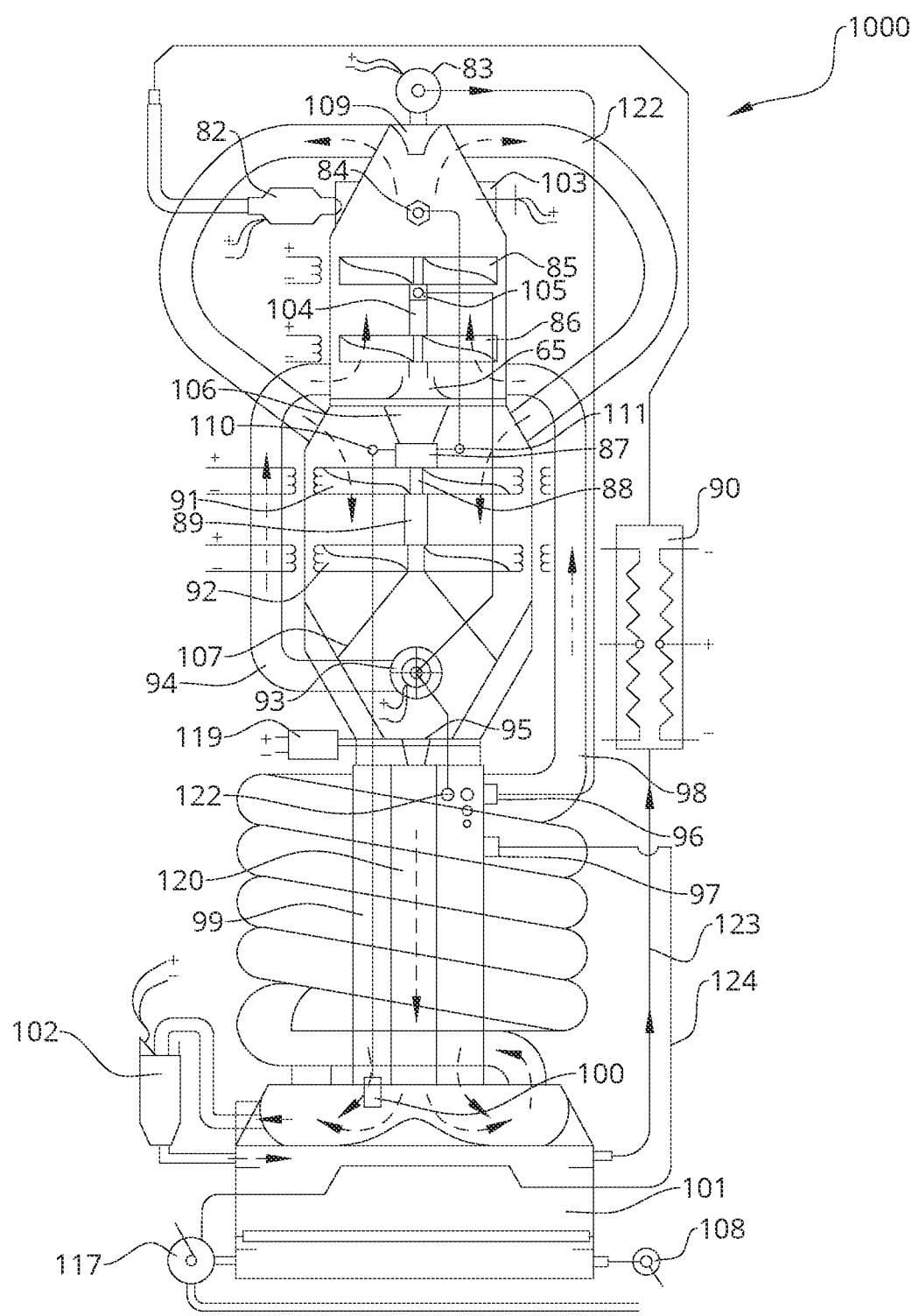
FIG. 1 is a diagrammatical cross-sectional view of an exemplary embodiment of the present invention.
Figure 2:
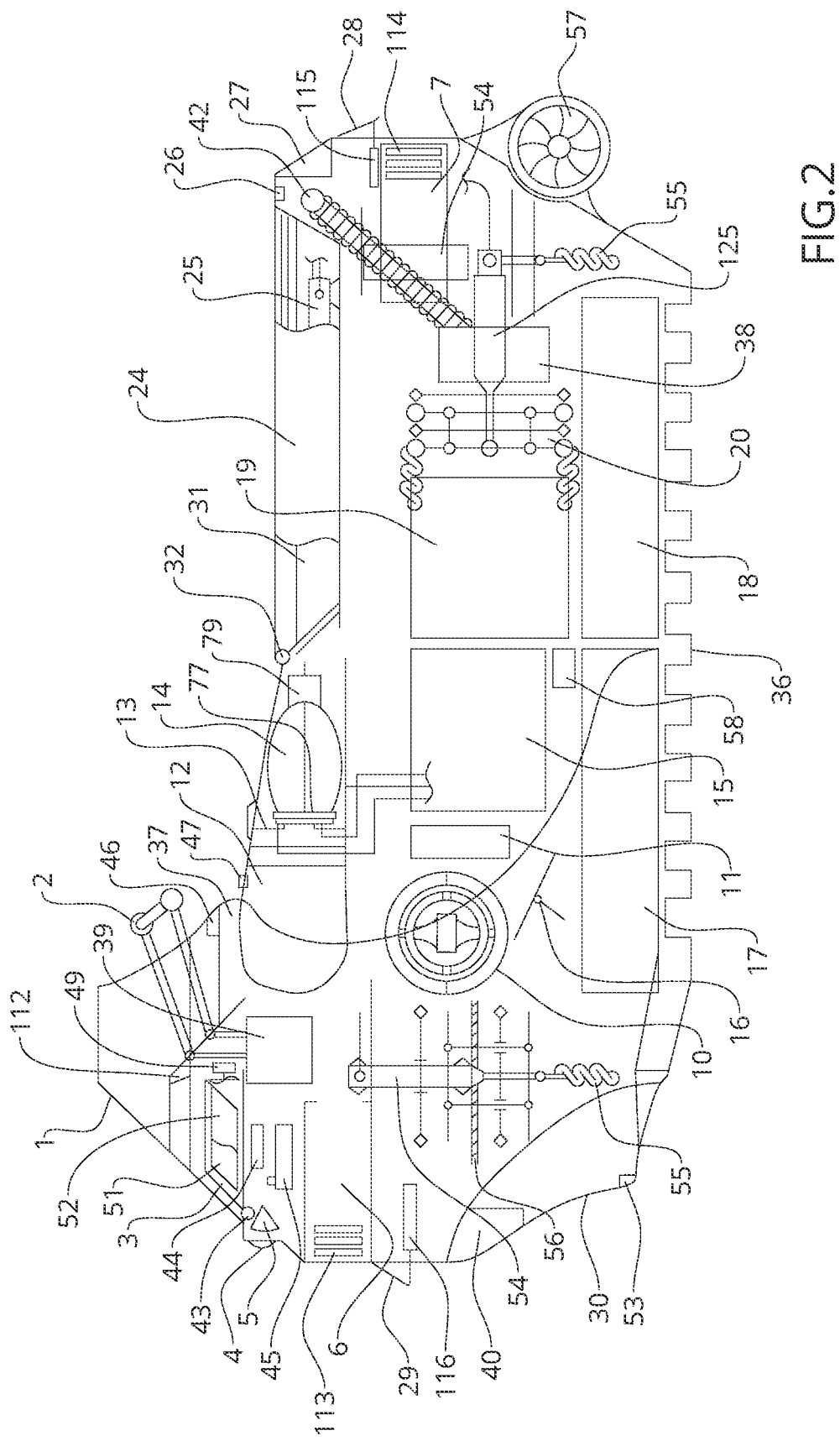
FIG. 2 is an elevation view of an exemplary embodiment of the present invention.
Figure 4:
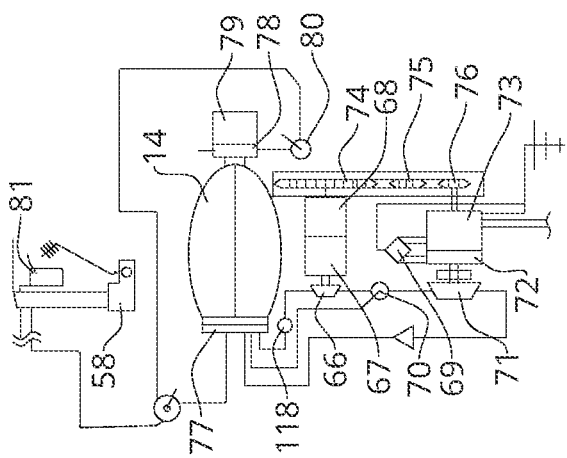
FIG. 4 is a detailed elevation view of pump systems of an exemplary embodiment of the present invention.
Figure 3:
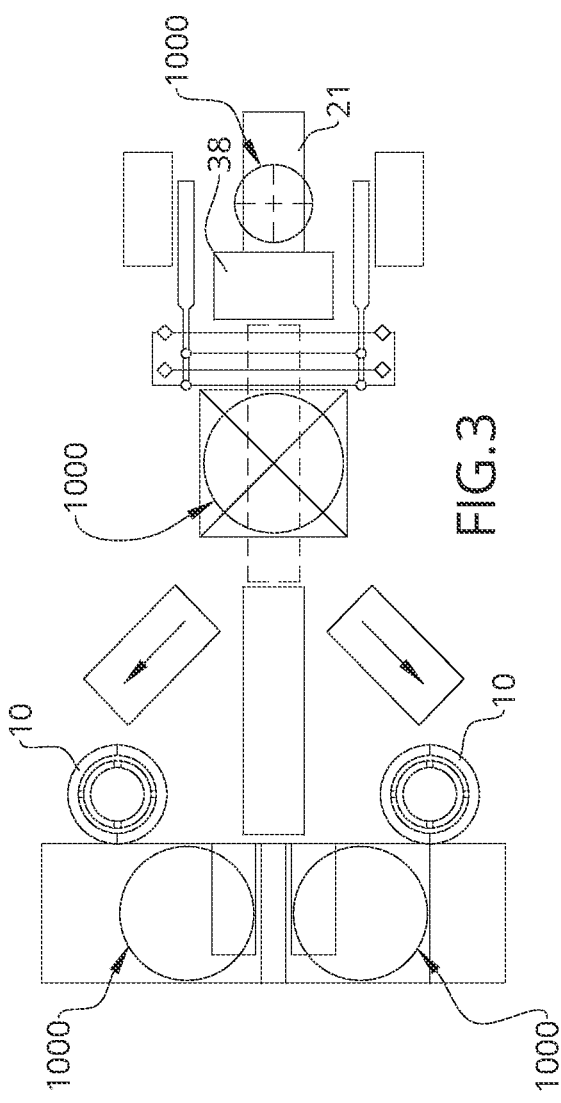
FIG. 3 is a schematic vector diagrammatical view of an exemplary embodiment of the present invention.
Figure 5:
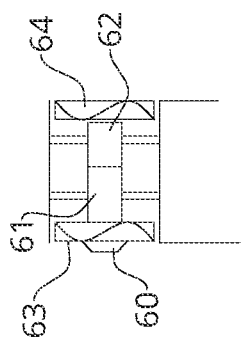
FIG. 5 is a schematic view of an exemplary embodiment of the present invention.

Referring now to FIGS. 1 through 5, the present invention may include the following systemic components.
1. Transparent wind screen impact resistant plastic
2. Dual flight control levers with instrument cluster to control lighting, horn, radio, and the like. The levers may swing slightly tilted to follow the arc of tilt for correct ergonomic grip. The "up and down" travel of the levers then adjust the current level to the electromagnetic levitation "plates" and by hydraulic fluid pressure change the "distance" between the attractive and repulsive levitation plates, thereby also increasing top plate magnetic intensity level, which in turn increases the oil jet's thrust displacement causing vehicle lift. The levers thus lift and lower the vehicle's altitude with a safety system to prevent crashing also using the radio bounce electronic sensor 53. The levers, also by hydraulic fluid piston, change the horizontal oil cycle propulsion system 18 and the left and right venting airflow cycle via louver exhaust ports 114 and 113. The right-hand grip may then be a "twist throttle" accelerator potentiometer to increase the electrical current to the design's horizontal "air cycle" and oil cycle propulsion systems electric compound hyper jets. The instrument cluster may also control the horn, lights, heated seat, and turn signal switch.

3. Enclosed propulsion radiator, "cooling system" forced air vent.
4. Quad fog lamp (sum of four) lamps.
5. Marker lamp and turn signal indication lamp house assembly, both sides.
6. Electric "air jet" atmospheric flight cycle propulsion—forward travel vector
7. Electric "air jet" atmospheric flight cycle propulsion—reverse travel vector.
8. Levitation repulsive electromagnetic hover system. The coulomb (magnetic) level may cause repulsive magnetic field "compression" (by way of upper electromagnet attractive magnetic poles upon the top two electromagnetic electromagnet plates with the upper most fixed frame/chassis mounted electromagnet) and thus effectively causing lift by high level magnetic attraction. Magnetic level is to exceed weight of vehicle plus load (rider) physical weight. The lower r electromagnetic "plate electromagnetic electromagnets" then are compressed by the powered hydraulic piston assembly located upon the assembly with final suction hydraulics then under the rider's seat. The "base" altitude ("idle height") affecting the electrical current level, as determined by the system altitude sensor 53, will then also reference the gimbal gyroscope mobiles to "maintain" craft's level bubble position. The system will allow for vehicle banking, tilting, and turning for rider safety.
9. Thermal insulation wraps the dual component pressure tank thin mil.
10. Gimbal gyroscope sensor—connects to the logic system "mapping" electronics to maintain level "position".
11. Hover craft electronics "bay" fuse/electrical relay—hinged access panel with slide out circuit boards for easy access.
12. High pressure air tank double encasement for safety, wherein the inner tank contains max pressure relief valve. The inner tank is configured to pressurize the oil upon the base of the hot oil compound lift jet, thereby increasing the lift capacity of the electric liquid pumping hyper jet.
13. Air/oil one way fill assembly—manual fill valve and kick pump air coupling to allow air to enter the pneumatic hydraulic oil fluid transfer slip ring and cause pressurized oil within the centrifugal rotation dual component pressure tank.
14. Centrifugal rotation dual component pressure tank.
15. Electricity production system—high voltage generator battery start cycle.
16. Foot pedal (left-right craft turn control) configured to cause slight magnetic increase in the levitation plates to cause "tilt" and changes the air louver solenoid position to cause the atmospheric air flight system containing the electric hyper jets (letter "E") to then actuate horizontal air pressure discharge for left-right steering.
17. Fixed position horizontal forward flight sealed oil pressure hyper electric jet.
18. Motorized circular positional (horizontal) sealed oil pressure hyper electric jet—contains trine component oil/air pressure "fluid transfer" through bore electricity transfer slip ring to allow oil/air pressure control, which in turn feeds electricity to the hyper jet oil pump electric motors changing the system speed. The vector direction is configured to be controlled by steering levers and actuators, in air flight mode, wherein the vehicle retro vector direction acts as a break. In outer space the jet can change position forward vector or retro breaking function configured to switch by secondary thumb button upon the right-hand control lever.
19. Sealed force vector electric hyper jet (letter "A").
20. Breaking levitation plate to cause magnetic resistance by hydraulic suction yielding a "craft braking effect" instigated by the right-side foot pedal and/or an electric push button upon the right-side hand grip lever that actuates solenoid system, thereby increasing the electricity level to the horizontal resistance vector levitation plates and hydraulic pressure oil pump, which in turn causes hydraulic piston travel (suction) compressing the electromagnets. The oil/fluid pressure is incorporated in the "braking" system wherein the "power breaking" oil pressure level is then assisted by the electric motor driven oil pump. The linear mechanical motion of the hydraulic piston under the seat (upon the main hydraulic system) is then urged by linear motion electric solenoid and electric valve actuated pumped oil pressure.
21. Aft electric hyper jet as a redundant lift system for flight safety (letter "A").
22. Pilot's seat.
23. Under seat electronics hinged fold down electronics "bay" contains system logic mapping under electromagnetic pulse inductance cage within the seat assembly to shield the sensitive electronics from electromagnetic pulse.
24. Weather durable waterproof seat covering also resistant to UVA, UVB, and UVC light.
25. Levitation main hydraulic fluid pumping system contains electric motor fluid reservoir main hydraulic fluid suction hydraulic piston assemblies and oil pumps that assist in the levitation plate compression levels "power driven fluid pressure."
26. Seat position lock latch and open handle.
27. Rear turn signal indication lamp, tail lamp, and break lamp assembly. Foot pedal actuator sensor and right-side steering lever push button lamp circuit.
28. Air flight (atmospheric) steering flap solenoid—causes louver position to change yielding left or right force vector air discharge.
29. "Steering flap" configured to cause the air from the reverse-vector electric "air jet" 7, to vector discharge left or right when closed, the flap then "open" when the atmospheric flight ""brake"" system is actuated.
30. Access panel for the head lamp and audio horn assembly.
31. Electromagnetic induction cage—electromagnetic pulse shielding embedded under pilot's seat padding.
32. Pilot's seat hinge.
33. Landing foot shock absorption "travel distance" sum of two independent "rubber track" style tread.
34. Air flow manifold.
35. Air flow manifold.
36. Dense rubber tread.

37. Wind shield fairing contour line (both sides).
38. Pilot's bio cycle "bay" amine air scrubber bio waste system air HVAC—heating ventilation air conditioning.
39. Flight control unit contains hydraulic valve system and mechanical low pressure actuation high pressure lever system.
40. Main dual head lamp assembly low beam high beam head lamps.
41. Air flow ducts.
42. Bio system connection coupling.
43. Wind screen hinge.
44. Battery charging system.
45. Craft main electrical storage battery.
46. Wind shield locking clasp buckle.
47. Inner high pressure max pressure safety vent inner high-pressure tank one way fill valve under fairing cap located at the nose forward of the of the tank that is also connected to the manual kick air pump assembly—the valve contains pressure level send "mechanical" to then relay pounds per square inch level to the dial mount display upon the instrument panel dashboard.
48. Pilot's safety harness hoop dual tether.
49. System cooling fan blower motor.
50. Instrumentation dashboard display air speed, altitude, lift engine speed, engine fault, electrical production level, component failure display, oil pressure level display, lamp failure warning light, system function display and "start" on/off control switch key lock.
51. Solid plate covers most of the actual system cooling radiator maintain system thermal parameter.
52. Radiator air vent.
53. Altitude sensor relays information to the logic control system to maintain height of flight and minimum flight height—logic safety redundancy to prevent accidental incorrect handle lever switch selection.
54. Levitation system hydraulic suction piston.
55. Retention mechanical coil spring pulls the hydraulic piston end acts as a stabilizer actuation dampener for gradual smooth operation. The coil spring is tension rated for the operational range and is secured to the end of the hydraulic piston and the craft frame (chassis).
56. Magnetic insulator.
57. Dual direction electric air flight rudder fan electric high-speed compound—when in "run" mode pulls in from the center line aft to then direct to the fan assembly ("E")—then vectoring outward left and right—with final encasement safety screen shielded to prevent physical accident to body or foreign object sucked into the engine causing air jet failure.
58. Manual kick air pump gear system (ease of use) gear reducer low recoil manual pressure required to compress high level of air pressure.
59. Air scoop—duct directed to the radiator chamber assist in velocity of air flow across the radiator.
60. Outer mount hall effect RPM (revolutions per minute) sensor unit with safety impact cover reports to the system's logic control to control air flow speed for the jet fan.
61. Dual shaft sealed explosion proof high speed electric motor shaft union to 62 input rotation.
62. High speed electric counter tilt gear set sealed lubrication (1:50 ratio gearing) high side rotation tandem to 64.
63. Impeller transonic propeller fan.
64. High speed air flow compressor fan.
65. Oil pump internal flow guide.
66. Oil impeller (centrifugal type).
67. Dual shaft explosion-proof, inert Nobel gas fill electric motor electrical current determined by the electronic logic main "mapping" electronics.
68. High speed gear set 1:150 rotation high side tandem with large sprocket (e.g., 12" dia. And drive chain assembly).
69. Voltage regulator (from permanent magnet brushless Magneto, directing electrical current to the field coil of the main high voltage generator).
70. Hydraulic draft control dampener valve with safety sensor—aids in controlling oil flow pipe structural integrity and generator system speed.
71. High-speed high-volume oil pump—induces the hydraulic draft of a pneumatically pressurized fluid to cause system speed incline yielding excessive amounts of electrical current allowed to be applied regulated to the crafts components.
72. Sealed explosion proof permanent magnet magneto electrical generator and speed regulation RPM sensor aids in controlling the generator's electrical re-introduction circuit sending information the main electronic logic control circuits producing stable idle speed.
73. High voltage generator—roller wheel electrical contacts—directs electrical current to vehicles system voltage regulated and redundant wiring for critical flight systems.
74. Large encased lubricated drive sprocket.
75. Adjustable tension sprocket.
76. Small receiving sprocket 4" dia.
77. Pneumatic pressure and fluid transfer through bore pressure rated slip ring.
78. Pneumatic impeller.
79. Dual shaft electric drive motor.
80. Generator pneumatic start sequence electric actuation valve.
81. Environmental air intake air filter—allows environmental air into the kick style air pump.
82. Electric hot oil injector—oil pump.
83. Max pressure safety valve—allows the oil chamber decompression directing oil to the lower pressure pneumatic cavitation within the main oil flow lift jet oil pump system.
84. External mount oil inlet pressure pipe coupling.
85. High speed oil flow compressor circumference brushless electricity generator permanent magnet circumference re-tension compression ban upon the permanent magnets—circumference guide tracks to stabilize rotation sealed bearing race. Increased field resistance can be directed to wire wound permanent magnet then about the circumference upon the generator to increase loading to produce more electrical power or to increase drag to slow the oil jet down in tandem with valve closures. Wire feed then at 107 traveling encased to the unit wire wound permanent magnets under the circumference compression ban in oil pump "hybrid magneto" electricity generator 85. The system contains required electrical through bore electricity transfer slip ring system to transfer electricity to the rotating oil draft pump compression system. The circuit then increases the magnetism of the permanent magnets about the circumference.
86. Oil flow impeller tandem rotation with the low side "input rotation" of the oil jet internal gear set 104 who's rotational output torque then is motivating electricity generator 85 to high rates of rotation—circumference electric motor armature with the drive field coil then within the pressure rated encasement—armature windings then also uses a compression circumference ban to resist wire winding elongation due to centrifugal motion—circumference guide tracks to stabilize rotation sealed bearing race.

87. Internal high speed oil pump.
88. Ratio gear set 1:150 ratio with internal RPM sensor. The through bore electricity/oil pressure slip ring allows the electricity re-introduction circuit path to increase the system speed by electrifying the oil pump jet's electric motor unit contain three electricity transferring multi track thru bore slip rings to direct electrical current to the units RPM sensor and the electric drive motors 89, 91, and 92.
89. Dual shaft electric drive motor inert gas fill explosion proof.
90. Electric resistance oil flow system oil heater—resistor "elements" then mounted to the oil flow encasement pipe and thermally insulated. The unit references the oil flow jet temperature sensor to maintain viscosity of the oil.
91. Main oil flow compressor—circumference brushless electric motor with armature circumference compression ban—circumference guide tracks to stabilize rotation sealed bearing race.
92. Main oil flow impeller—circumference brushless electric motor with armature circumference compression ban—circumference guide tracks to stabilize rotation sealed bearing race.
93. Main oil jet venturi decompression safety valve—a trine external pipe compression coupling connecting three external oil pipes and a three-stage safety sensor/mechanical pressure limiter valve that assists in oil jet pressure regulation.
94. Venturi decompression oil flow pipe.
95. Main discharge throttle valve system electric actuation with mechanical default to the closed position to stop the oil jet oil flow lift pressure cycle—discharge to focus to a smaller diameter oil flow to impale the internal air pressure baffle apex sending the flow perpendicular.
96. Over pressure oil "return" pressure coupling.
97. Air pressure injection compression coupling.
98. Main coil oil return coil pipe fill pressurized oil into the wick chamber—compression pipe fitting into the top chamber (containing 65), then a one-way valve coupling compression pipe fitting.
99. Oil sump oil pump 87 oil intake pipe external mounting.
100. Oil sump intake screen—high velocity capacity as the velocity of the oil is at high rate per unit volume vs. Unit of time.
101. Oil pressurizer chamber—oil is compressed by high pneumatic pressure injected under the divider pressure plate piston and compression ring assembly causing the oil pressure within the oil jet to increase. The oil is then reaching a sufficient pressure level increasing the venturi oil discharge volume and pressure to lift the hover craft—internal piston plate compression ring system also contains a gland bushing system (dual gland bushing) to prevent hydraulic fluid from subverting the piston plate ring system.
102. Oil jet electric injector—oil pump, return oil injector used in the heat cycle and to return the oil pressure chambers pneumatic pressure to the main storage tank 12.
103. Oil jet temperature sensor used to regulate the system's electric resistance oil heater flow system.
104. High speed ratio gear set 1:150 high side tandem rotation to electricity generator 85.
105. Drive line rotation oil impeller.
106. Oil pump mounting frame.
107. Oil pump mounting frame.
108. High pneumatic pressure valve electric solenoid actuation with dual retained mechanical coil spring.
109. Oil flow guide.
110. External oil pipe coupling.
111. External oil pipe coupling.
112. Instrumentation dashboard dial illuminated gauges and system parameter display.
113. Turn vents left and right-side electric solenoid actuated louvers.
114. Turn vents left and right-side electric solenoid actuated louvers.
115. Air flap solenoid actuates to re-direct the air flow to turn the flight craft.
116. Air flap solenoid actuates to re-direct the air flow to turn the flight craft left or right.
117. Air flow valve mechanical coil spring regulated to "meter" volume of air pressure into the oil exhaust chamber.
118. Generator system on/off flow valve default "natural position" to the almost closed position retained by mechanical coil spring and full opened by the valve's circular solenoid (think watch and cam).
119. Throttle valve control unit.
120. Thrust discharge chamber "pipe" then with open ports along its length so that air pressure can fill the chamber—internal flow guide baffle (located in the bottom half/under the air pressure zone) to send the down vector oil discharge perpendicular within the air pressure then venting through the ports within the core (center) chamber offsetting the static in the force equation with hard mounting then transferring the impalement force to the tinsel strength of the suspended mounting of the cone.
121. External oil pipe—pipe compression coupling with one way valve allowing over pressure oil to enter the pneumatic pressure within the thrust displacement chamber.
122. Oil pipe.
123. High pressure oil pipe.
124. High pressure pneumatic pipe.
125. Hydraulic piston assembly for magnetic "break" function.

DESCRIPTION

The following aerospace design system embodied in the present invention is a fuel less pneumatic/hydraulic lift system to then act as an "air boat" like a jet ski with the power of flights. The lift system pneumatically pressurizes nonconductive nonflammable oil that is pumped by compound accelerating compressor fans that resemble jet craft propellers/with impeller advancement upon the dual propeller assemblies.

The design system is a vehicle intended to demonstrate sustained electrical production can produce sustained lift. The start sequence then being critical in its order. The required pneumatic pressure, full battery and oil levels must be at their functional requirement. The dashboard will indicate a "green" light/lamp when system check when preparing to "start" the vehicle's system.

The manual actuation of filling the "base hydraulic cylinder" upon the oil lift jets is a two-stage sequence. The first air pressurization then is the "thrust chamber fill cycle" followed by the oil pressurization cycle to produce a "work potential tilt" within the oil jet.

For example, if providing the base hydraulic cylinder with 1000 PSI (pounds per square inch) of hydraulic pressure, the "thrust displacement chamber" then also with the same pressure level then closing the air pressure valve to the thrust chamber, thereby increasing the "base hydraulic cylinder" to 1400 PSI of air pressure with the throttle control valve in "closed" condition. The work potential "tilt" then allows for the oil at 1400 PSI to force vector, with the oil jet's electric motors active, oil pressure into the thrust chamber having 1000 PSI of pneumatic pressure and its displacement causing hydraulic draft yielding incline oil flow velocity producing vehicle lift. Oil exhaust pressure from the oil heater then a coupler with one way valve. A back pressure tendency will be observed yet counteracted upon with the electric motors active.

The oil acts like a solid under pressure and will inject into the chamber producing force vectoring thrust lifting the vehicle by its mounting system affixed to the chassis. By the oil jet's design, the flow cycle will produce hydraulic draft while producing electrical current. It may be required to gradually increase the magnetic resistance in the high-speed draft compressor to yield sufficient levels to apply to the magnetic levitation plates. Additionally, "the skid pan" may contain a safety redundant "active" electrical generator to compensate for system failure or fault when in operation. The skid pan also will contain the required electronics to manage the electrical load level.

The levitation plates mounting system will require excessive strength due to their fatigue cycles. A fluid driven electrical "pick up" wire wound rod may be placed adjacent to the compression field lines (lower levitation plate between the north magnetic pole and south magnetic pole so that its spin induces electricity in the rotating rod perpendicular to the magnetic fields) to prevent unwanted induction upon the chassis with the electrical current harvested then directed to the oil jets drive cycle.

The "rod" then spinning by the oil pressure impaling an end mount small hydraulic impeller non electrically conductive shaft coupling, with the oil pressure diverted from the main generators oil exhaust pressure post oil pump then returning to the rotating egg-shaped pressure tank fluid through bore slip ring.

The wound rod system implements non electrically conductive mounting to prevent unwanted electrical shock hazard. The "rod" magnetically shielded/insulated with shock casing projectile shield for safety. The "rod" does not cause lift failure for top plate levitation function or fault the inverted magnetic wells shape causing failure; rather, the rod controls the extenuating electromagnetic field correctly. Rod electrical contacts +/− then "roller wheel" type. "rod" position then at the same height as the lower fixed levitation plate.

It should be noted that the design oil flow line/"metal pipes" are electrically grounded to prevent unwanted electrical capacitance due to fluid motion causing static electricity. The top plate upon the levitation assemblies may be hard mounted to the chassis, the electromagnet then upon the fixed electromagnetic is mounted to the carriage and causes an attractive force to lift the frame mounted fixed electromagnetic electromagnet.

This produces a deeper inverted magnetic "well" that causes uplift of the vehicle. The lower travel plate electromagnet is disposed in a magnetic pole repulsive alignment also causing a lift "effect" to the vehicle chassis. Magnetic shielding is then placed where required to prevent biology (riders/pilots) from being exposed to high level magnetic fields. Mounting components are electrically insulated from the chassis and are electrically grounded, including the oil flow pipes for the electric oil lift jets. Vehicle systems, where required, are then "watertight/weatherproof" to prevent electrical shock hazard.

Generator system 15 is then able to "re-introduce" produced electrical current back into the electric motor 67 increasing the speed of the generator assembly. These yields higher levels of current to apply to the crafts components. The electricity generator 85, then is in the same fashion i.e., able to "direct" electrical current back to the vehicle's electrical load requirement (vehicle components).

The vehicle will be able to dock mount an airtight air pressure retaining impact and radiation shielded heated canopy "bubble" to then protect the pilot better in outer space. The canopy has an additional amine Carbon Dioxide ($CO_2$) scrubber as part of its system. The underside skid pan is also a radiant energy "radiation shield" to block full range radiation.

Upon the chassis skid plate a plurality of mounting bores with "torsion cage" to mount two cold plasm drive system listed at https://www.designdeskinc.com/cold-plasma-drive-toroid-static-compressor.html up positional servo electric motors with radian sensors to assist in navigation for long range flight.

All valves do not allow fluid lock. Additional "letter "A" may be added adjacent to letter "C" upon each side of the fixed letter "C" to increase total lift. The oil displacement chamber then tends toward producing vacuum by ultra-high-speed compressor 85.

The above design system implements redundant flight systems to ensure stable flight with the system logic control then able to compensate automatically also adjusting the design to the ever-changing terrain. The craft then senses the topography and can maintain altitude by electronic sensor. This makes controlling the hover craft an easy experience.

As used in this application, the term "about" or "approximately" refers to a range of values within plus or minus 10% of the specified number. And the term "substantially" refers to up to 80% or more of an entirety. Recitation of ranges of values herein are not intended to be limiting, referring instead individually to any and all values falling within the range, unless otherwise indicated, and each separate value within such a range is incorporated into the specification as if it were individually recited herein.

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length" means the longest dimension of an object. Also, for purposes of this disclosure, the term "width" means the dimension of an object from side to side. For the purposes of this disclosure, the term "above" generally means superjacent, substantially superjacent, or higher than another object although not directly overlying the object. Further, for purposes of this disclosure, the term "mechanical communication" generally refers to components being in direct physical contact with each other or being in indirect physical contact with each other where movement of one component affect the position of the other.

The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the invention and that modifications may be made without departing from the spirit and scope of the invention as set forth in the following claims.

What is claimed is:

1. A fuel less pneumatic and hydraulic lift system flight system, the flight system comprising:
    a chassis supporting an electric battery and a pressurized base hydraulic cylinder;
    a hydraulic fluid pumping assembly fluidly coupled to the pressurized base hydraulic cylinder;
    a lift mechanism assembly comprising:
        an attractive levitation plate mounted to the chassis; and
        a repulsive levitation plate mounted to a carriage, wherein the repulsive levitation plate is disposed in a magnetic pole repulsive alignment relative to the attractive levitation plate causing a magnetic lift effect to the chassis; and
    a plurality of propulsions jets mounted to the chassis, wherein the plurality of propulsion jets enabling motive functionality using hydraulic fluid propulsion and pneumatic pressure via the hydraulic fluid pumping assembly in conjunction with the magnetic lift effect.

2. The flight system of claim 1, wherein the hydraulic fluid pumping system comprises:
    an electric motor electrically connected to the battery;
    a fluid reservoir;
    an oil hydraulic piston pump; and a
    fluidly coupled hydraulic fluid suction assembly for selectively adjusting a compression level of one or more of said levitation plates.

3. The flight system of claim 2, further comprising an electric air flight rudder for controlling the plurality of propulsions jets.

4. The flight system of claim 3, wherein each air jet is configured to have a flow cycle producing hydraulic draft while producing electrical current.

5. The flight system of claim 4, further comprising a thrust displacement chamber disposed between the pressurized base hydraulic cylinder and the plurality of propulsion jets, wherein a first air pressurization in the thrust displacement chamber urges a pressurization cycle producing force vectoring thrust in each of the plurality of propulsion jets.

6. The flight system of claim 5, further comprising two or more turn vents for selectively redirecting an air flow from the plurality of propulsion jets via actuated louvers.

7. The flight system of claim 6, further comprising one or more flight control levers configured to electrically adjust a magnetic field strength corresponding to a vertical direction relative to attractive and repulsive levitation plates.

8. The flight system of claim 7, wherein a hydraulic fluid pressure via the hydraulic fluid pumping assembly is configured to change a distance between the attractive and repulsive levitation plates.

9. The flight system of claim 8, further comprising one or more flight control levers, controlling the one or more turn vents and the magnetic field strength via the oil hydraulic piston pump.

10. The flight system of claim 9, wherein each propulsion jet comprises an oil-air pressure fluid transfer component enabling oil-air pressure control, which in turn feeds electricity to a hyper jet oil pump electric motor.

* * * * *